US008167652B1

(12) United States Patent
Ju

(10) Patent No.: US 8,167,652 B1
(45) Date of Patent: May 1, 2012

(54) SHIELDED CONNECTOR HAVING A SHIELDING BODY WITH AN INSULATING PAINT LAYER RECEIVED IN SLOTS OF AN INSULATING BODY

(75) Inventor: Ted Ju, Keelung (TW)

(73) Assignee: Lotes Co., Ltd., Keelung (TW)

( * ) Notice: Subject to any disclaimer, the term of this patent is extended or adjusted under 35 U.S.C. 154(b) by 0 days.

(21) Appl. No.: 13/097,154

(22) Filed: Apr. 29, 2011

(30) Foreign Application Priority Data

Dec. 22, 2010 (CN) .......................... 2010 1 0601373

(51) Int. Cl.
*H01R 13/648* (2006.01)
*H01S 4/00* (2006.01)

(52) U.S. Cl. ................................. 439/607.13; 29/592.1

(58) Field of Classification Search ............ 439/607.02–607.13; 29/592.1, 832, 852; 361/800; 174/35 R
See application file for complete search history.

(56) References Cited

U.S. PATENT DOCUMENTS

| | | | | | |
|---|---|---|---|---|---|
| 4,916,804 | A * | 4/1990 | Yoshimura et al. | .......... | 29/592.1 |
| 5,169,340 | A * | 12/1992 | Nakata et al. | ............ | 439/607.27 |
| 6,276,966 | B1 * | 8/2001 | Yamoto et al. | ........... | 439/607.13 |
| 7,661,988 | B1 * | 2/2010 | He et al. | ................... | 439/607.32 |
| 7,938,683 | B2 * | 5/2011 | Nagata | ..................... | 439/607.13 |
| 2006/0121781 | A1 * | 6/2006 | Zhang et al. | .................. | 439/607 |
| 2009/0321122 | A1 * | 12/2009 | Mori et al. | .................... | 174/261 |
| 2010/0233905 | A1 * | 9/2010 | Nagata | ..................... | 439/607.13 |

* cited by examiner

*Primary Examiner* — Chandrika Prasad

(74) *Attorney, Agent, or Firm* — Morris Manning & Martin LLP; Tim Tingkang Xia, Esq.

(57) ABSTRACT

A shielded connector. In one embodiment, the shielded connector includes: a seat, including a plurality of receiving slots, in which a shielding body is formed on at least a part of an inner surface of the receiving slot by physical-plating and an insulating paint layer is formed on the shielding body by immersing, spraying or coating, at least one conductive body disposed outside the receiving slots and connected to the shielding bodies, and at least one lead-out portion disposed adjacent to the motherboard and electrically connecting the conductive body to the motherboard; and a plurality of conductive terminals, accommodated in the receiving slots, each including a contact portion exposed at one side of the seat, a body portion extending from the contact portion into the receiving slot, and a connecting portion extending from the body portion and exposed outside the receiving slot.

10 Claims, 3 Drawing Sheets

SHIELDED CONNECTOR HAVING A SHIELDING BODY WITH AN INSULATING PAINT LAYER RECEIVED IN SLOTS OF AN INSULATING BODY

CROSS-REFERENCE TO RELATED APPLICATIONS

This non-provisional application claims priority under 35 U.S.C. §119(a) on Patent Application No. 201010601373.6 filed in China, P.R.C. on Dec. 22, 2010, the entire contents of which are hereby incorporated by reference.

FIELD OF THE INVENTION

The present invention relates to a shielded connector, and more particularly to a shielded connector with an improved fabricating efficiency.

BACKGROUND OF THE INVENTION

To solve the problem of electromagnetic interference during signal transmission, a shielded connector has been proposed in the prior art, which electrically connects a butting electronic component to a motherboard and includes a seat and a plurality of conductive terminals accommodated in the seat.

The seat includes: a plurality of receiving slots, in which a shielding body is disposed on an inner surface of each of the receiving slots, and an insulating block with through holes is further disposed in each of the receiving slots; a conductive body, disposed outside the receiving slots, located on a bottom surface of the seat, and communicating the shielding bodies; and a plurality of lead-out portions, disposed adjacent to the motherboard, and electrically connecting the conductive body to the motherboard.

The conductive terminal includes: a contact portion, exposed at one side of the seat and in electrical contact with the butting electronic component; a body portion, extending from the contact portion into the through holes of the insulating block and accommodated in the receiving slot; and a connecting portion, extending from the body portion, exposed at the other side of the seat and electrically conducted with the motherboard.

In the shielded connector, the insulating blocks are used to electrically insulate the conductive terminals from the shielding bodies, but the insulating blocks need to be disposed in the receiving slots one by one, which affects the assembling efficiency. Also, since the through holes of the insulating blocks are relatively small, the alignment of the conductive terminals and the through holes becomes more difficult, which further affects the efficiency of assembling the conductive terminals to the seat and finally affects the fabricating efficiency of the shielded connector.

In view of the above, the shielded connector in the prior art has the defect that the fabricating efficiency of the shielded connector is low.

Therefore, a heretofore unaddressed need exists in the art to address the aforementioned deficiencies and inadequacies.

SUMMARY OF THE INVENTION

Accordingly, the present invention is directed to a shielded connector with an improved fabricating efficiency.

In one aspect of the present invention, a shielded connector is provided. The shielded connector includes: a seat, including a plurality of receiving slots, in which a shielding body is formed on at least a part of an inner surface of the receiving slot by physical-plating and an insulating paint layer is formed outside the shielding body by immersing or spraying, at least one conductive body disposed outside the receiving slots and connected to the shielding bodies, and at least one lead-out portion disposed adjacent to the motherboard and electrically connecting the conductive body to the motherboard; and a plurality of conductive terminals, accommodated in the receiving slots, each conductive terminal including a contact portion exposed at one side of the seat and in electrical contact with the butting electronic component, a body portion extending from the contact portion into the receiving slot, and a connecting portion extending from the body portion, exposed outside the receiving slot and conducted with the motherboard.

As compared with the prior art, in the shielded connector of the present invention, since the conductive terminal is electrically insulated from the shielding body by the insulating paint layer, and the insulating paint layer is integrally formed by immersing or spraying, no assembling process is required. Meanwhile, since the thickness of the insulating paint layer is much smaller than that of the insulating block, the size of the receiving slot is not influenced, which further avoids increasing the difficulty in assembling the conductive terminal to the seat and improves the fabricating efficiency.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention.

Wherever possible, the same reference numbers are used throughout the drawings to refer to the same or like elements of an embodiment, and wherein.

Figure 1:
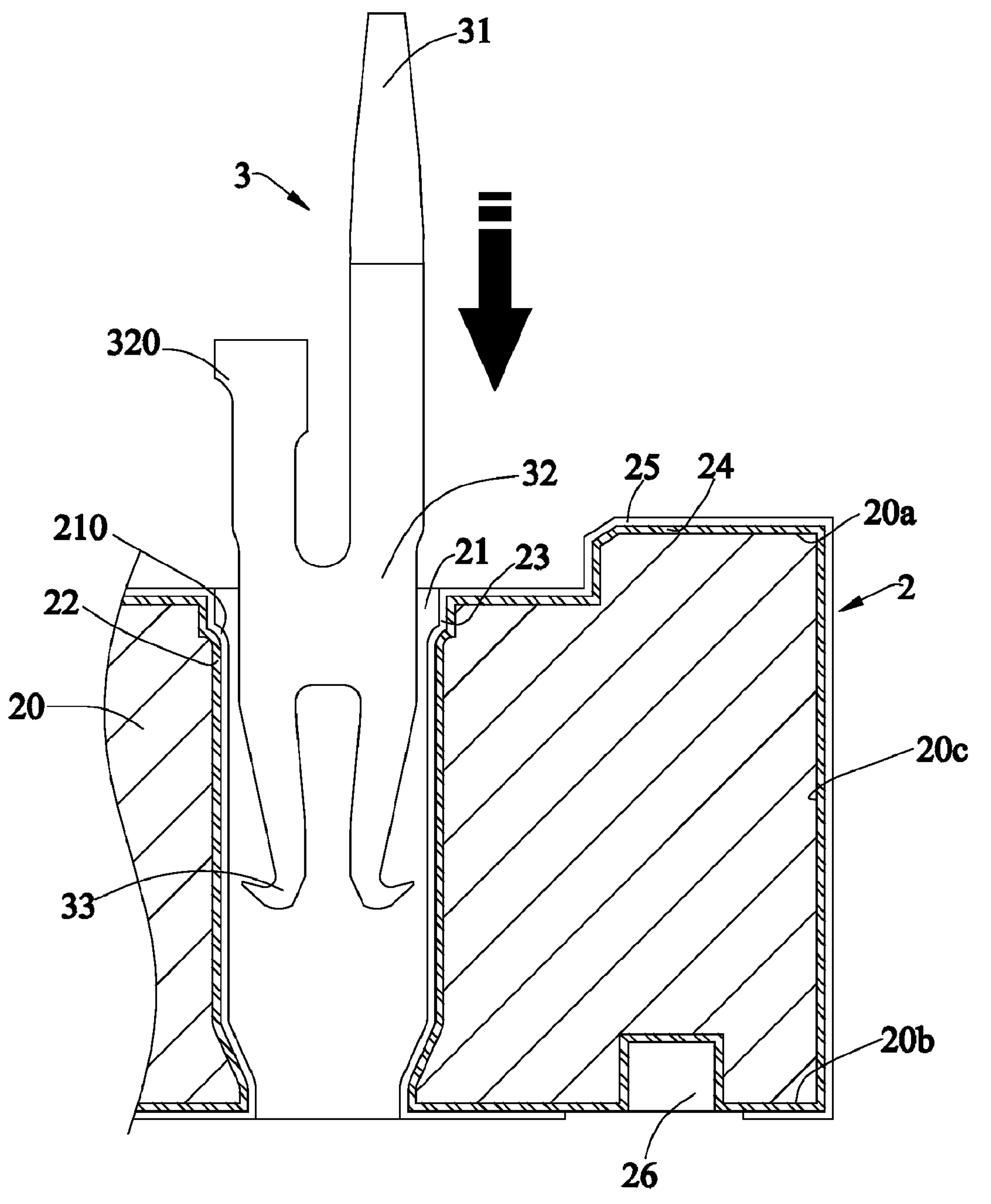
FIG. 1 is a schematic view of a shielded connector according to one embodiment of the present invention fitted to a motherboard.
Figure 2:
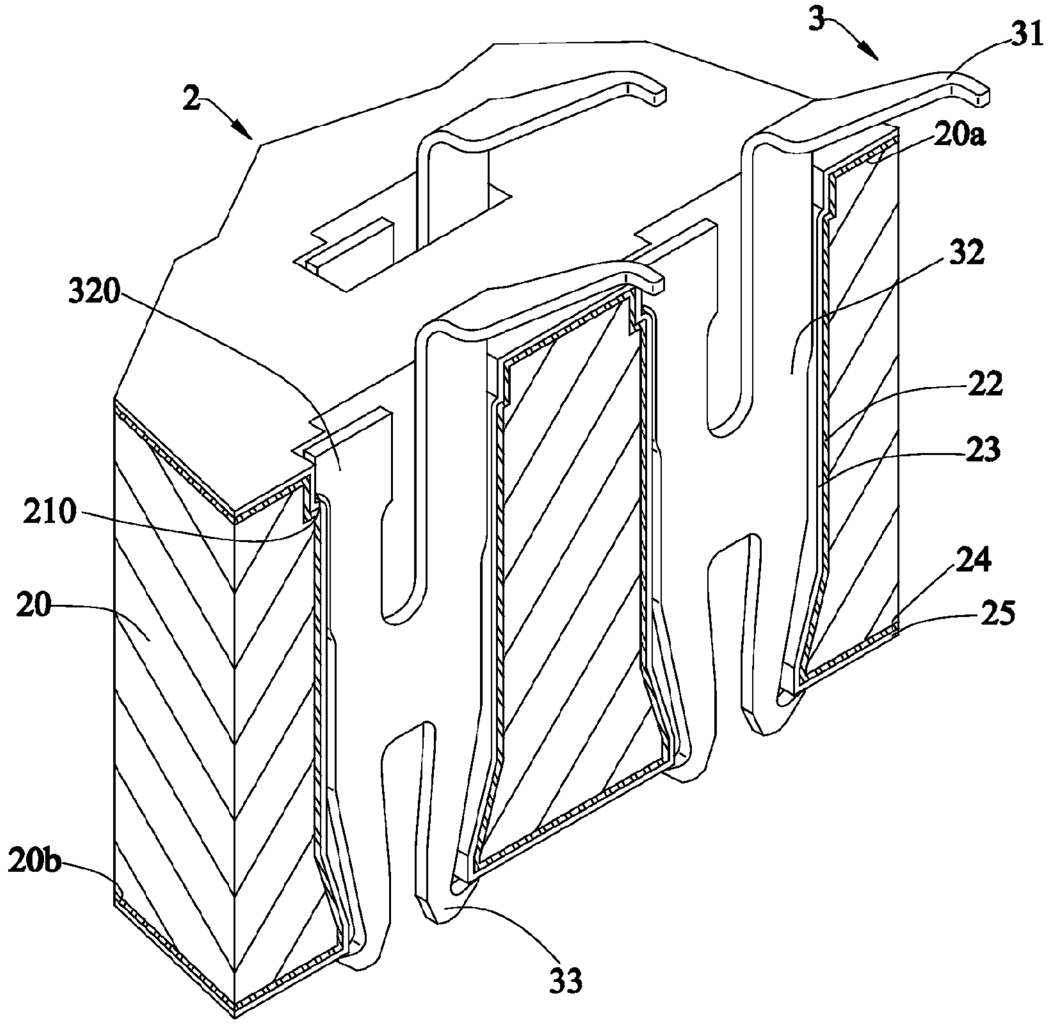
FIG. 2 is a schematic partial sectional view of the shielded connector according to one embodiment of the present invention.
Figure 3:
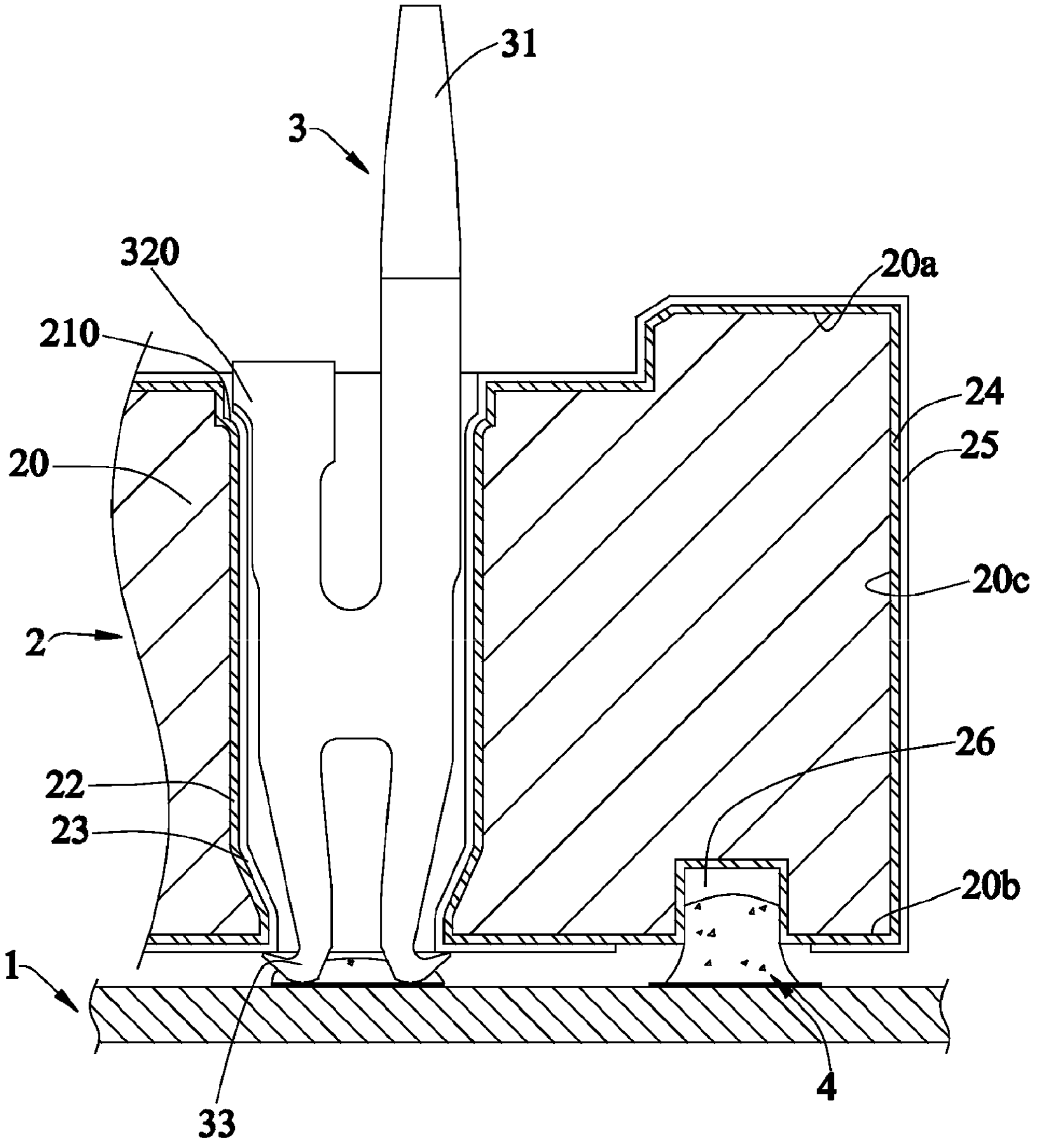
FIG. 3 is a schematic view of a shielded connector according to another embodiment of the present invention fitted to a motherboard.

List of Reference Numerals in FIGS. 1-3:

Motherboard 1
Seat 2

| | | |
|---|---|---|
| Insulating body 20 | Upper surface 20a | Lower surface 20b |
| Side surface 20c | Shielding body 22 | Isolator 23 |
| Conductive body 24 | Spacer 25 | Lead-out portion 26 |
| Receiving slot 21 | Step region 210 | |
| Conductive terminal 3 | Contact portion 31 | Body portion 32 |
| Connecting portion 33 | Urging region 320 | |

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The shielded connector of the present invention is further described in detail below with reference to the accompanying drawings and specific embodiments.

Referring to FIGS. 1 and 2, the shielded connector of the present invention connects a butting electronic component (not shown) to a motherboard 1 and includes a seat 2 and a plurality of conductive terminals 3 accommodated in the seat 2.

The seat 2 includes an insulating body 20. The insulating body 20 has an upper surface 20*a* adjacent to the butting electronic component, a lower surface 20*b* opposite to the upper surface 20*a* and adjacent to the motherboard 1, and a plurality of side surfaces 20*c* connecting the upper surface 20*a* and the lower surface 20*b*.

The insulating body 20 further includes a plurality of receiving slots 21 formed through the upper surface 20*a* and the lower surface 20*b*, a shielding body 22 is disposed on an inner surface of each receiving slot 21, an isolator 23 is disposed on the shielding body 22, a conductive body 24 is disposed outside the receiving slots 21 and connected to the shielding bodies 22, a spacer 25 is disposed on the conductive body 24, and four lead-out portions 26 are located at corners of the seat 2 (alternatively, may be further disposed at the center of the seat 2), in which the lead-out portions 26 are disposed adjacent to the motherboard 1 and connect the conductive body 24 to the motherboard 1.

The receiving slot 21 is recessed to form a step region 210 at a position adjacent to the upper surface 20*a*.

The material of the shielding body 22 is copper or stainless steel, and alternatively other materials may be used.

The shielding body 22 may be disposed on the inner surface of the receiving slot 21 by physical-plating (for example, vacuum evaporation or vacuum sputtering).

The material of the conductive body 24 is copper or stainless steel, and alternatively other materials may be used.

The conductive body 24 may be formed by physical-plating (for example, vacuum evaporation or vacuum sputtering).

In this embodiment, the shielding body 22 and the conductive body 24 are integrally formed. Alternatively, the shielding body 22 and the conductive body 24 may also be separately formed.

The isolator 23 is an insulating paint layer, specifically may be an ultraviolet curing paint layer or a polyurethane resin coating layer, and is used for electrically insulating the conductive terminal 3 from the shielding body 22. The isolator 23 is formed outside the shielding body 22 by immersing, spraying or coating.

The spacer 25 is an insulating paint layer, specifically may be an ultraviolet curing paint layer or a polyurethane resin coating layer, and is used for electrically insulating the seat 2 from the outside and particularly for electrically insulating the butting electronic component from the seat 2, and electrically insulating the motherboard 1 from the seat 2. The spacer 25 is arranged all over the conductive body 24 by immersing, spraying or coating.

In this embodiment, the isolator 23 and the spacer 25 are integrally formed. Alternatively, the isolator 23 and the spacer 25 may also be separately formed.

The spacer 25 is disposed outside the conductive body 24 arranged on the upper surface 20*a* so as to avoid the conduction between the butting electronic component and the conductive body 24 arranged on the upper surface 20*a*. The spacer 25 is disposed outside the conductive body 24 arranged on the lower surface 20*b* so as to avoid the conduction between the motherboard 1 and the conductive body 24 arranged on the lower surface 20*b*.

Referring to FIG. 1, the lead-out portions 26 are recessed inwards from the bottom surface of the seat 2 and each includes a conductive layer. The lead-out portions 26 are soldered to the motherboard 1.

The conductive terminal 3 includes a contact portion 31 exposed at one side of the seat 2 and in electrical contact with the butting electronic component, a body portion 32 extending form the contact portion 31 into the receiving slot 21, and a connecting portion 33 extending from the body portion 32, exposed at the other side of the seat 2 and electrically conducted with the motherboard 1.

The method for manufacturing a shielded connector includes the following steps.

An insulating body with a plurality of receiving slots is formed by injection-molding a liquid crystal polymer (LCP) material.

A shielding body is plated in the receiving slot by physical-plating, and a conductive body and a lead-out portion are plated on at least one side of the insulating body.

An insulating paint layer is formed outside the shielding body and the conductive body by immersing, spraying or coating.

The insulating paint layer is cured.

A plurality of conductive terminals is formed by stamping.

The conductive terminals are assembled into the receiving slots.

When the insulating paint layer is an ultraviolet curing paint layer, the curing method is irradiation.

Alternatively, different curing methods such as heat curing may be adopted depending upon different materials of the insulating paint layer.

In other embodiments, the conductive body 24 is only disposed on the lower surface 20*b*, or the shielding bodies 22 of each row of the receiving slots 21 share one conductive body 24 for connection, as long as the conductive body 24 communicates the shielding bodies 22 and is conducted with the lead-out portions 26. Numerous configurations can be adopted, which will not be enumerated one by one herein.

In other embodiments, the spacer 25 is only disposed outside the conductive body 24 on the lower surface 20*b* and the spacer 25 is not disposed outside the conductive body 24 arranged on the side surfaces 20*c* and the upper surface 20*a*, or the spacer 25 is disposed outside the conductive body 24 arranged on the upper surface 20*a* and the lower surface 20*b*. All of the above configurations aim to avoid the conduction between the conductive body 24 and the adjacent motherboard 1, the butting electronic component and the like. Numerous configurations can be adopted, which will not be enumerated one by one herein.

In other embodiments, the lead-out portions 26 are recessed from the side surfaces 20*c*, or the lead-out portions 26 are located on the side surfaces 20*c* and the lead-out portions 26 are adjacent to the motherboard 1.

In other embodiments, the number of the lead-out portions 26 may also be 1, 2, 3 or more, or one lead-out portion 26 may be disposed every other rows of the receiving slots 21.

Numerous configurations can be adopted, which will not be enumerated one by one herein. However, the lead-out portions 26 need to be arranged evenly to ensure consistent interference shielding for every signal terminal 3*b*, thus improving the shielding effect.

In other embodiments, the conductive terminals 3 include a plurality of signal terminals (not labeled) and a plurality of power supply terminals (not labeled). Correspondingly, the receiving slots 21 include a plurality of signal terminal slots (not labeled) for accommodating the signal terminals and a plurality of power supply terminal slots (not labeled) for accommodating the power supply terminals. In order to avoid short circuit between the power supply terminal 3 and the conductive body 24 due to breakdown of the isolator 23 in the power supply terminal slot, the shielding body 22 is not disposed on the inner surface of the power supply terminal slot.

The present invention, among other things, has the following beneficial effects.

(1) In the shielded connector of the present invention, since the conductive terminal 3 is electrically insulated from the shielding body 22 by the insulating paint layer 23, and the insulating paint layer 23 may be formed by immersing, spraying or coating, the forming efficiency of the insulating paint layer 23 is relatively high. Since no assembling process is required, the fabricating efficiency of the shielded connector can be improved.

(2) The ultraviolet curing paint layer can be dried quickly, which is beneficial for mass production, and since the ultraviolet curing paint layer can be cured by irradiation, no curing agent is required. Furthermore, the ultraviolet curing paint layer has a good hardness and thus can reduce the risk of short circuit between the shielding body 22 exposed after the ultraviolet curing paint layer is scraped and the conductive terminal 3 in the process of assembling the conductive terminal 3 to the seat 2. Meanwhile, the ultraviolet curing paint contains an organic solvent, which can reduce the environmental pollution. In addition, since the loss of the ultraviolet curing paint layer is extremely low in the forming process, the recycling procedure can be reduced, and the required working space is reduced. The ultraviolet curing paint layer is also heat resistant and can endure the high temperature generated in the working process of the shielded connector, so softening will not occur.

(3) The polyurethane resin coating layer has good attachment to surfaces of various materials, which can reduce the defective rate of products and widen the range of materials suitable for the insulating body 20. Also, the polyurethane resin coating layer is highly abrasion-resistant, and thus can reduce the risk of short circuit between the shielding body 22 exposed after the ultraviolet curing paint layer is scraped and the conductive terminal 3 in the process of assembling the conductive terminal 3 to the seat 2. Furthermore, the polyurethane resin coating layer has desirable gloss and transparency and a beautiful appearance. The polyurethane resin coating layer is also heat resistant and can endure the high temperature generated in the working process of the shielded connector, so softening will not occur.

(4) Since the lead-out portions 26 are uniformly distributed on the seat 2, consistent interference shielding for every conductive terminal 3 is achieved, which can ensure the uniformity of signal transmission and improve the shielding effect.

(5) The shielding body 22 is not disposed on the inner surface of the receiving slot receiving the power supply terminal, and the wall between neighboring receiving slots 21 has a large thickness and is not easily broken down, short circuit between the power supply terminal and the conductive body 24 can be avoided.

Although the preferred embodiments of the present invention are described in detail above, they are not intended to limit the scope of the present invention. Any equivalent variations or modifications made without departing from the spirit of the present invention shall fall within the scope of the present invention.

What is claimed is:

1. A shielded connector, connecting a butting electronic component to a motherboard, comprising:

a seat, having a plurality of receiving slots, wherein a shielding body is formed on at least a part of an inner surface of the receiving slot by physical-plating and an insulating paint layer is formed on the shielding body by immersing, spraying or coating, at least one conductive body disposed outside the receiving slots and connected to the shielding bodies, and at least one lead-out portion disposed adjacent to the motherboard and electrically connecting the conductive body to the motherboard; and a plurality of conductive terminals, accommodated in the receiving slots, each conductive terminal having a contact portion exposed at one side of the seat and in electrical contact with the butting electronic component, a body portion extending from the contact portion into the receiving slot, and a connecting portion extending from the body portion, exposed outside the receiving slot and conducted with the motherboard.

2. The shielded connector according to claim 1, wherein the material of the shielding body is copper or stainless steel.

3. The shielded connector according to claim 1, wherein a spacer is disposed outside the conductive body.

4. The shielded connector according to claim 1, wherein the lead-out portion is soldered to the motherboard.

5. The shielded connector according to claim 1, wherein the insulating paint layer is an ultraviolet curing paint layer or a polyurethane resin coating layer.

6. A method for manufacturing a shielded connector, comprising:

forming an insulating body with a plurality of receiving slots by injection-molding;

plating a shielding body in the receiving slot by physical-plating, and plating a conductive body and a lead-out portion on at least one side of the insulating body;

forming an insulating paint layer outside the shielding body and the conductive body by immersing or spraying;

curing the insulating paint layer;

forming a plurality of conductive terminals by stamping; and assembling the conductive terminals into the receiving slots.

7. The method for manufacturing a shielded connector according to claim 6, wherein the physical-plating is vacuum sputtering.

8. The method for manufacturing a shielded connector according to claim 6, wherein the lead-out portion is uniformly distributed on the insulating body.

9. The method for manufacturing a shielded connector according to claim 6, wherein the insulating paint layer is an ultraviolet curing paint layer and the curing method is irradiation.

10. The method for manufacturing a shielded connector according to claim 6, wherein the insulating paint layer is cured by heating.

* * * * *

UNITED STATES PATENT AND TRADEMARK OFFICE

CERTIFICATE OF CORRECTION

PATENT NO. : 8,167,652 B1
APPLICATION NO. : 13/097154
DATED : May 1, 2012
INVENTOR(S) : Ted Ju

It is certified that error appears in the above-identified patent and that said Letters Patent is hereby corrected as shown below:

On the cover page of the patent, Column 1, Item 54:
"SHIELDING CONNECTOR HAVING A SHIELDING BODY WITH AN INSULATING PAINT LAYER RECEIVED IN SLOTS OF AN INSULATING BODY"

Should read:
--ELECTRICAL CONNECTOR HAVING A SHIELDING BODY WITH AN INSULATING PAINT LAYER RECEIVED IN SLOTS OF AN INSULATING BODY--

In the Specification, Column 1, Lines 1-4:
"SHIELDING CONNECTOR HAVING A SHIELDING BODY WITH AN INSULATING PAINT LAYER RECEIVED IN SLOTS OF AN INSULATING BODY"

Should read:
--ELECTRICAL CONNECTOR HAVING A SHIELDING BODY WITH AN INSULATING PAINT LAYER RECEIVED IN SLOTS OF AN INSULATING BODY--

Signed and Sealed this
Tenth Day of July, 2012

David J. Kappos
*Director of the United States Patent and Trademark Office*